United States Patent
Alghamdi (10) Patent No.: US 8,433,557 B2
(45) Date of Patent: Apr. 30, 2013

(54) SYSTEM AND METHOD OF TRANSLITERATING NAMES BETWEEN DIFFERENT LANGUAGES

(75) Inventor: Mansour M. Alghamdi, Riyadh (SA)

(73) Assignee: Technology Development Center, King Abdulaziz City for Science and Technology, Riyadh (SA)

( * ) Notice: Subject to any disclaimer, the term of this patent is extended or adjusted under 35 U.S.C. 154(b) by 357 days.

(21) Appl. No.: 12/845,340

(22) Filed: Jul. 28, 2010

(65) Prior Publication Data

US 2011/0275037 A1 Nov. 10, 2011

Related U.S. Application Data

(60) Provisional application No. 61/332,516, filed on May 7, 2010.

(51) Int. Cl.
*G06F 17/28* (2006.01)
(52) U.S. Cl.
USPC .................... 704/4; 704/5; 704/8; 704/9
(58) Field of Classification Search ............. 704/4–10
See application file for complete search history.

(56) References Cited

U.S. PATENT DOCUMENTS

| 6,024,571 | A | * | 2/2000 | Renegar | 434/157 |
| 7,107,215 | B2 | * | 9/2006 | Ghali | 704/257 |
| 2003/0040909 | A1 | * | 2/2003 | Ghali | 704/235 |
| 2005/0222838 | A1 | * | 10/2005 | Gong | 704/5 |
| 2007/0156404 | A1 | * | 7/2007 | Lee et al. | 704/254 |

* cited by examiner

*Primary Examiner* — Leonard Saint Cyr
(74) *Attorney, Agent, or Firm* — Andrew M. Calderon; Roberts Mlotkowski Safran & Cole, P.C.

(57) ABSTRACT

Both a system and method are provided for transliterating a name written in the letters of an alphabet of a source language to a name in the letters of an alphabet of a target language. The system includes instructions to determine whether the letters of the alphabets of the source and target languages are the same. If so, the instructions transliterate the name into the same letters used in the source language alphabet. If not, the instructions (1) determine the sound associated with each of the letters of the source language that form the name; (2) transliterate the letters into letters of the International Phonetic Alphabet (IPA) to create a same or similar sounding name in the letters of the IPA; (3) determine the sound associated with each of the letters of the target language, and (4) transliterate the letters of the IPA form into letters of the target language.

7 Claims, 2 Drawing Sheets

SYSTEM AND METHOD OF TRANSLITERATING NAMES BETWEEN DIFFERENT LANGUAGES

CROSS REFERENCE TO RELATED APPLICATIONS

This application claims the priority of U.S. Provisional Application No. 61/332,516 filed May 7, 2010, the contents of which are incorporated by reference herein in their entirety.

FIELD OF THE INVENTION

This invention generally relates to transcription methods between languages, and is specifically concerned with a system and method for transliterating a personal name from the alphabet of one language into a same or similar-sounding name in the alphabet of a different language.

BACKGROUND

A name is not a mere word that other persons pronounce but is intimately connected to the identity of a particular person or entity. Consequently, every one of us corrects pronunciation of his or her name when others do not pronoun or write it correctly. Conversely, persons who mistakenly write or pronounce a name incorrectly are typically apologetic in recognition of the strong relation between a person and his or her name. Even more importantly, a mistake in the writing of a name may have adverse legal consequences as such a misspelled name may confer rights to someone not entitled to them, or revoke rights to someone entitled to them. So, in organizations such as passport departments, police departments, banks and hospitals, the accuracy and care with which names are correctly spelled is of great importance.

The aforementioned problems have been greatly exacerbated as a result of increased global travel between countries that speak different languages and use different alphabets. Such travel often requires a transliteration of the traveler's name from the alphabet of the traveler's home (or "source") country into the alphabet of the visited (or "target") country between the following three documents:

1—A national ID card: Such cards are issued by many countries to identify their citizens. For example, the Kingdom of Saudi Arabia issues a National ID Card to each of its citizens, and the person's name is written on it in the official letters of the state.

2—Passport: This is an ID which the state issues to its citizens to allow them to travel among different countries, and the person's name is written on it in Roman letters.

3—Resident ID: This is an ID card issued by the host country to the foreign person residing in it. This ID facilitates the person's travel inside the host country without the need for using the passport. In this ID card, the person's name is written in the official language of the host country so that concerned entities such as police departments, traffic regulators, recruitment departments, work places, universities and other organizations and officials can read the name, write it, and record it in an archive or official record. This kind of document is called "residence permit" or "Iqama" in Saudi Arabia.

So, under the present system, the name of a traveler in his identity documents is often written in three different writing systems. For instance, for a Chinese citizen who wishes to travel to and reside for a time in Saudi Arabia, his name will be written according to the Chinese writing system in his national ID, in Roman letters in his passport, and in Arabic letters in his residence permit for Saudi Arabia. This means that the name transfers from its original system of writing to two different writing systems, one of which is the writing system in Roman letters which is internationally applicable for passports, the other of which is the writing system of the host or "target" country.

Transliteration systems have been devised to deal with the problem of converting a name written in a non-Roman alphabet into Roman letters. The advantage of such systems is that they provide a consistent transliteration of names into Roman letter form. However, such systems are limited to the conversion of a single non-Roman language into Roman letters (e.g., Arabic into English) and are not applicable to all non-Roman languages. Even worse, there is no standard, universal system for transliterating a name from a source country into a name in a target country in the case where the source and target countries use different alphabets. Accordingly, different transliterations are possible when different transliteration systems are used, which may lead to the same problems that a misspelling of the name causes.

The problems associated with the transliteration of names is not confined to the names of persons, but also extends to the names of companies, international trade marks, and the names of medicines, medical systems and equipment and their associated intellectual property law rights. Hence there is also a need for a mechanism for transliterating such trade names and trademarks in such a manner that the sound of the trade name or trademark in the target language is the same or very similar to the sound of the name or trademark in the source language. Presently, there is no standardized, universal process for the transliteration of such trade names and trademarks. This again results in such names and marks being written in multiple ways, which is potentially confusing to the consumer, and may give rise to the infringement of intellectual property rights associated with these names and marks.

SUMMARY

The present invention is both a system and method for transliterating a name written in the letters of an alphabet of a source language to a name in the letters of an alphabet of a target language that is different from the source language comprising that overcomes the aforementioned shortcomings associated with the prior art. To this end, the system of the invention comprises a CPU, a computer readable memory and a computer readable storage media; and first, second and third program instructions. The first program instructions determine whether the letters of the alphabets of the source and target languages are the same or substantially the same. If so, the second program instructions transliterate the name into the same letters used in the source language alphabet. If not, the third program instructions (1) determine the sound associated with each of the letters of the source language that form the name; (2) transliterate the letters of the name in the source language into letters of the International Phonetic Alphabet (IPA) to create the same sounding name in the letters of the IPA; (3) determine the sound associated with each of the letters of the target language, and (4) transliterate the letters of the IPA form of the name into letters of the target language to create a same or similar sounding name in the letters of the target language.

In a case where not all letters of the name are available in the target alphabet, the second program instructions may further include choosing the letter in the target alphabet closest in appearance to the corresponding letter in the source alphabet is transliterated In a case where no single letter in the target alphabet accurately corresponds to the sound of a letter of the IPA name, the third program instructions may further include transliterating said non-corresponding letter of the IPA form of the name into a letter of the target alphabet that most closely resembles the sound represented by said one IPA letter to create a similar sounding name in the letters of the target language. Alternately in such a case, the third program instructions may include transliterating said one non-corresponding letter of the IPA form of the name into a pair of letters or a plurality of letters or no letters of the target language to create a same or similar sounding name in the letters of the target language.

Finally, in a case where no single letter in the target alphabet accurately corresponds to the sound of a letter of the IPA name, the third program instructions may further include transliterating the non-corresponding IPA letter into a symbol of the target language assigned to sounds that are not present in the target language to create a same or similar sounding name in the letters of the target language.

By transliterating the name from the source language first into the letters of the International Phonetic Alphabet (IPA) and then into the letters of the target language, the system of the invention is able to more consistently generate a same or similar sounding name in the letters of the target language with a greater degree of accuracy than systems in which the source language is first Romanized before being transliterated into the target language, since the IPA has many more letters than the Roman alphabet and hence is capable of providing a much more phonetically-accurate "intermediate" representation of the name than the Roman alphabet is capable of. Moreover, the system of the invention provides an immediate, universal solution to the problem of transliteration between any two languages and obviates the need for individually determining transliteration rules between every possible combination of the world's hundreds of languages.

BRIEF DESCRIPTION OF THE SEVERAL VIEWS OF THE DRAWING

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Basic Types of Writing Systems:

Before the specific details of the invention are described, a brief summary of the different types of writing systems will be made so that the problems associated with phonetic transliterations between languages may be more fully appreciated.

Writing is merely the encoding of speech. Speech is the origin, and writing is just a documentation of what is pronounced. So, the objective of any writing system is to represent or symbolize speech in a way that any speaker of that language can transfer the written form to a spoken form, and names are parts of what people write. Different methods of writing emerged, and all of them serve the same purpose of transferring speech into codes in a way that speech can be recovered upon reading these code, and the writer and reader must have knowledge of the language which he/she writes and reads. However, before explaining the system of transliterating the names among languages, we have first of all to know various writing systems as such systems are the ones transliteration of names will be from and to them. The systems of writing contemporary languages can be divided as follows:

1. Abecedarian Writing Systems:

These are writing systems based on phonetic relation (phonemic) between speech and writing. This means that every code represents a phoneme, but this type of writing does not cover the vowels, and is only restricted to consonants, and sometimes it covers some consonants. In this system, the reader recognizes the vowels even though they are not available in writing through reading the consonants, and this is due to the fact that he has linguistic knowledge of the words of that language and its syntax and morphological system. Some examples of this is the writing system of Arabic and Hebrew languages (Table 1). This is what the reader notices upon reading these lines, as the signs of tashkil (sounds at end of words) which symbolize vowels in Arabic language are completely absent.

This system is the most summarized way of writing speech in phonemic symbols as it has the least possible number of writing symbols. It is known that phoneme is the smallest phonetic unit which can change the meaning, hence the number of these units constitutes the minimum limit of representing speech in writing, in addition to the fact that part of the phonemes are not represented in writing which are the vowels and this makes writing symbols more shortened.

TABLE 1

Hebrew Language Writing System

| א | ב/ב | ג | ד | ה | ו | ז | ח | ט |
|---|---|---|---|---|---|---|---|---|
| אָלֶף | בֵּית/וֵית | גִּימֶל | דָּלֶת וְדֶלֶד | הֵא (הֵי) | וָו | זַיִן | חֵית | טֵית |
| alef | bet/vet | gimel | dalet(d) | he(y) | vav | zayin | chet | tet |
| ' | b/v | g | d | h | w | z | h/ch | t |
| [ʔ, ∅] | [b, v] | [g] | [d] | [h] | [v] | [z] | [x] | [t] |
| 1 | 2 | 3 | 4 | 5 | 6 | 7 | 8 | 9 |

| י | כ/ך | ל | מ | ם | נ | ן | ס |
|---|---|---|---|---|---|---|---|
| יוֹד (יוּד) | כַּף/כָף | כָּף סוֹפִית | לָמֶד | מֵם | מֵם סוֹפִית | נוּן | נוּן סוֹפִית | סָמֶד |
| yod (yud) | kaf/khaf | kaf sofit | lamed | mem | mem sofit | nun | nun sofit | samech |
| y/i | k/kh | final kaf | l | m | final mem | n | final nun | s |
| [j] | [k, x] | [] | [l] | [m] | [] | [n] | [] | [s] |
| 10 | 20 | 30 | 40 | 50 | 60 |

| ע | פ/ף | ף | צ | ץ | ק | ר | ש/שׁ | ת |
|---|---|---|---|---|---|---|---|---|
| עַיִן | פֵּא | פֵּא סוֹפִית | צָדִי (צָדִיק) | צָדִי סוֹפִית | קוֹף (קוּף) | רֵיש (רֵיש) | שִׁין/שִׂין | תָּו/תָף |
| ayin | pe(y)/fe | pe sofit | tzadi(k) | tzadi sofit | kof (kuf) | resh (reyish) | sin/shin | tav(f) |
| ' | p/f | final pe | tz/ts/z | final tzadi | k | r | sh/s | t |
| [ʔ, ∅] | [p, f] | | [t͡s] | | [k] | [ʁ] | [ʃ, s] | [t] |
| 70 | 80 | | 90 | | 100 | 200 | 300 | 400 |

TABLE 1-continued

Hebrew Language Writing System

Common orthography additions (mainly for foreign borrowings)

| ג' | ד' | ז' | ח' | ע' | צ' | ת' |
|---|---|---|---|---|---|---|
| [dʒ] | [ð] | [ʒ] | [ħ] | [ʕ/ɣ] | [tʃ] | [θ] |

The Hebrew language writing system is an alphabetic (abecedarian) system in which only consonants are written, while vowels are ignored. Here, you can see the letter form and name, and it is written according to International Phonetic Alphabetic (IPA). In the last line there is a group of symbols added to letters of Hebrew language for purpose of writing words of foreign origin which have phonemes not available in Hebrew.

2. Alphabetic Writing Systems

These systems consist of writing symbols representing all phonemes in the language including consonants (an example of which are the symbols of written consonants of the Korean language shown in Table 2A) and vowels (an example of which are the Korean language vowels shown in Table 2B). These systems are similar to the alphabetic writing system mentioned above, but add symbols for writing vowels. Examples of other such systems include languages like Armenian, Greek, Latin, and Somali.

TABLE 2

A-Korean Writing System-Consonants

| ㄱ 기역 | ㄲ 쌍기역 | ㄴ 니은 | ㄷ 디귿 | ㄸ 쌍디귿 | ㄹ 리을 | ㅁ 미음 | ㅂ 비읍 | ㅃ 쌍비읍 |
|---|---|---|---|---|---|---|---|---|
| giyeok | ssang giyeok | nieun | digeut | ssang digeut | rieul | mieum | bieup | ssang bieup |
| g, k | kk | n | d, t | tt | l | m | b, p | pp |
| k, g | kk | n | t, d | tt | l, r | m | p, b | pp |
| [k/g] | [k*] | [n] | [t/d] | [t*] | [l/r] | [m] | [p/b] | [p*] |

| ㅅ 시옷 | ㅆ 쌍시옷 | ㅇ 이응 | ㅈ 지읒 | ㅉ 쌍지읒 | ㅊ 치읓 | ㅋ 키읔 | ㅌ 티읕 | ㅍ 피읖 | ㅎ 히읗 |
|---|---|---|---|---|---|---|---|---|---|
| shiot | ssang shiot | leung | jieut | ssang jieut | chieut | kiuek | tieut | pieup | hieut |
| s | ss | ng | j | jj | ch | k | t | p | h |
| s | ss | -ng | ch, j | tch | ch' | k' | t' | p' | h |
| [s] | [s*] | [∅/-ŋ] | [tʃ/dʒ] | [tʃ*] | [tʃʰ] | [kʰ] | [tʰ] | [pʰ] | [h] |

TABLE 2B

Korean Writing System-Vowels

| ㅏ | ㅐ | ㅑ | ㅒ | ㅓ | ㅔ | ㅕ | ㅖ | ㅗ | ㅘ | ㅙ |
|---|---|---|---|---|---|---|---|---|---|---|
| a | ae | ya | yae | eo | e | yeo | ye | o | wa | wae |
| a | ae | ya | yae | ŏ | e | yŏ | ye | o | wa | wae |
| [a] | [ae] | [ja] | [jae] | [ʌ] | [e] | [jʌ] | [je] | [o] | [wa] | [wae] |

| ㅚ | ㅛ | ㅜ | ㅝ | ㅞ | ㅟ | ㅠ | ㅡ | ㅢ | ㅣ |
|---|---|---|---|---|---|---|---|---|---|
| oe | yo | u | wo | we | wi | yu | eu | ui | i |
| oe | yo | u | wŏ | we | wi | yu | ŭ | ŭi | i |
| [we] | [jo] | [u] | [wʌ] | [we] | [wi] | [ju] | [ɨ] | [ɨi] | [i] |

The above two tables illustrate each letter of the Korean alphabet, the name of each letter, and the phonetic equivalent in the IPA (indicated by bracketed characters).

3. Syllabic Alphabetic Systems

In these systems, each symbol represents a syllable formed from phonemes that consists of at least one vowel, as shown below:

TABLE 4A

The Bangladeshi Writing System: Syllables Consisting of a Single Vowel

| অ | আ | ই | ঈ | উ | ঊ | ঋ | এ | ঐ | ও | ঔ |
|---|---|---|---|---|---|---|---|---|---|---|
| a | ā | i | ī | u | ū | ṛ | e | ai | o | au |
| [ɔ, o] | [a:] | [i, e] | [i] | [u, o] | [u] | [ri] | [e, ae] | [oj] | [o] | [ow] |

More typically, each syllable represented by a symbol actually represents the sound made by a consonant in combination with a vowel as shown in Table 4B below.

TABLE 4B

The Bangladeshi Writing System: Syllables Consisting of a Consonant+ Vowel

| ক | ka | [kɔ] | খ | kha | [kʰɔ] | গ | ga | [gɔ] | ঘ | gha | [gʱɔ] | ঙ | ṅa | [ŋɔ] |
|---|---|---|---|---|---|---|---|---|---|---|---|---|---|---|
| চ | ca | [tʃɔ] | ছ | cha | [tʃʰɔ] | জ | ja | [dʒɔ] | ঝ | jha | [dʒʱɔ] | ঞ | ña | [nɔ] |
| ট | ṭa | [ʈɔ] | ঠ | ṭha | [ʈʰɔ] | ড | ḍa | [ɖɔ] | ঢ | ḍha | [ɖʱɔ] | ণ | ṇa | [nɔ] |
| ত | ta | [t̪ɔ] | থ | tha | [t̪ʰɔ] | দ | da | [d̪ɔ] | ধ | dha | [d̪ʱɔ] | ন | na | [nɔ] |
| প | pa | [pɔ] | ফ | pha | [pʰɔ] | ব | ba | [bɔ] | ভ | bha | [bʱɔ] | ম | ma | [mɔ] |
| য | ya | [jɔ] | র | ra | [rɔ] | ল | la | [lɔ] | | | | | | |
| শ | śa | [ʃɔ/sɔ] | ষ | ṣa | [ʃɔ] | স | sa | [ʃɔ/sɔ] | হ | ha | [ɦɔ] | | | |
| য় | ẏa | [dʒɔ] | ড় | ṛa | [ɽɔ] | ঢ় | ṛha | [ɽɔ] | | | | | | |

The bracketed combination of symbols in Tables 4A and 4B represent the phonetic equivalent of the syllabic symbols in IPA. In addition to Bangladeshi, Taiwanese and the Tamil language also employ a syllabic alphabet.

4. Symbolic Writing Systems

The most complex writing systems are symbolic writing systems wherein every individual symbol represents a full word. Because the number of words is much bigger than the number of phonemes in any language, such writing is difficult due to the need to remember thousands of symbols. This type of writing system makes it particularly difficult to transliterate names from other languages because there are often no symbols which would correspond in meaning to the foreign name. Examples of languages which use a symbolic writing system are: Chinese, pre-colonial Vietnamese, and Japanese.

| 一 | 二 | 三 | 心 | 玉 | 竹 | 見 | 金 | 面 | 骨 |
|---|---|---|---|---|---|---|---|---|---|
| 1 stroke | 2 strokes | 3 strokes | 4 strokes | 5 strokes | 6 strokes | 7 strokes | 8 strokes | 9 strokes | 10 strokes |
| yī | èr | sān | xīn | yù | zhú | jiàn | jīn | miàn | gǔ |
| one | two | three | heart | jade | bamboo | to see | gold | face | bone |
| 魚 | 黃 | 鼎 | 鼻 | 齒 | 龍 | 龠 | 簡 | 譏 | 覺 |
| 11 stroke | 12 strokes | 13 strokes | 14 strokes | 15 strokes | 16 strokes | 17 strokes | 18 strokes | 19 strokes | 20 strokes |
| yú | huáng | dǐng | bí | chǐ | lóng | yuè | jiǎn | shī | jué |
| fish | yellow | cauldron | nose | tooth | dragon | flute | simple | knowledge | to feel |
| 鐵 | 韂 | 體 | 鱣 | 齹 | 釅 | 軆 | 鸚 | 鬱 | 鱻 |
| 21 stroke | 22 strokes | 23 strokes | 24 strokes | 25 strokes | 26 strokes | 27 strokes | 28 strokes | 29 strokes | 30 strokes |
| tiě | jiàn | tǐ | shàn | hóng | yàn | nóng | yīng | yù | xiān |
| steel | saddle-cloth | body | sturgeon | school | scar | head cold | parrot | luxuriant | fresh |
| 灩 | 龘 | 麤 | 㰤 | 齉 | 䨻 | 龘 | 䶵 | | |
| 31 stroke | 32 strokes | 33 strokes | 35 strokes | 36 strokes | 39 strokes | 48 strokes | 64 strokes | | |
| yàn | tà | cū | yà | nàng | bìng | tà | zhé | | |
| billowing | fight of dragon | rough | lacking teeth | clocked nose | | | talkative | | |

Some of these symbols are quite complicated, and require a number of lines. It should be noted that every symbol represents a word.

Any universal transliteration system must be able to accurately and consistently transliterate a name from any one of the four different types of alphabets into a different alphabet.

Relationships Between Languages and Writing Systems:

To simplify the transliteration of names between different languages and writing systems, it is useful to consider instances where (1) the spoken languages are closely related to each other but employ different writing systems, (2) the spoken languages are not related but the writing system is the same, (3) the spoken languages are related and the writing system is the same, and languages which have a unique writing system (i.e. a writing system that applies only to it and no other language).

1. Languages Close to Each Other in Origin and Different in Writing System:

Some languages stem from the same family, so they are linguistically close to each other, but use different writing systems. For example, the Croatian and Serbian languages are close in origin and phonetically overlap in many ways but Croatian is written in Roman letters while Serbian is written in the Syrian letters shown below:

TABLE 7

Syrian Writing System Used for Writing the Serbian Language.

Consonants

[consonant table with phonetic transcriptions including k, y, t, z, w, h, d, g, b, t, r, q, p, s, n, m, l and associated bracketed IPA symbols]

Vowel diacritics

[vowel diacritics row with bä, ba, bi, be, and [u]]

Another example is Hindi and Urdu which are similar in origin and sound the same in many ways. However, Hindi is written in Sencicreti letters while Urdu is written in Arabic letters.

2. Languages of Different Origins which Use the Same Writing System

There are languages which are completely different in their origins, and which belong to different families but are written in the same letters. Examples include Malawi, English, Swahili, Hungarian, Vietnamese and Turkish which are all written in Roman letters. This is also applicable to Arabic and Farsi which are both written in Arabic letters, while the first belongs to the Semitic language family and the other is Indo-European.

3. Languages Close in Both Origin and Writing:

Examples of such languages include French, English, German and Spanish which all belong to the European languages, and are all written in Roman letters.

4. Languages with Unique Writing Systems:

While most languages share writing systems, there are some languages which have a separate, independent writing system such as in Armenian, Tamil, Korean, Mongolian and Amharic.

TABLE 8

The Amharic Writing System as in the Ethiopian and Somali languages.

| | ã | u | i | a | c | ∸ | o |
|---|---|---|---|---|---|---|---|
| h | | | | | | | |
| h | | | | | | | |
| s | | | | | | | |
| l | | | | | | | |
| k | | | | | | | |
| b | | | | | | | |
| c | | | | | | | |
| n | | | | | | | |
| (a) | | | | | | | |
| h | | | | | | | |
| (a) | | | | | | | |
| z | | | | | | | |
| d | | | | | | | |
| g | | | | | | | |
| c' | | | | | | | |
| s' | | | | | | | |
| f | | | | | | | |

TABLE 8-continued

The Amharic Writing System as in the Ethiopian and Somali languages.

| | ã | u | i | a | c | ∸ | o |
|---|---|---|---|---|---|---|---|
| š | | | | | | | |
| s | | | | | | | |
| m | | | | | | | |
| r | | | | | | | |
| h | | | | | | | |
| k | | | | | | | |
| l | | | | | | | |
| h | | | | | | | |
| ň | | | | | | | |
| k | | | | | | | |
| w | | | | | | | |
| z | | | | | | | |
| y | | | | | | | |
| j | | | | | | | |
| t' | | | | | | | |
| p' | | | | | | | |
| s' | | | | | | | |
| p | | | | | | | |

The previous classification is of great importance, as the use of a common writing system or the closeness in the sounds between the two languages can be used to vastly simplify the problem of achieving an accurate, same or close sounding transliteration of a name in one language to another language.

Method and System of the Invention:

From the foregoing discussion, it is evident that there are a number of problems that must be solved before a name in one language can be accurately transliterated into a phonetic equivalent in another language. The writing systems used for many languages are not only radically different from one another, but frequently do not, in themselves, provide an accurate phonetic representation of the word or name that they represent in the source language. Clearly this is true in languages using a symbol-type writing system, such as Chinese, where there is no hint whatever as to how the word represented by the symbol is to be pronounced, and also in abecedarian writing systems where only consonants are written, the vowel sounds being inferred by the reader. But it is also true for most alphabetic writing systems. For example, it is not enough for a person to know Arabic letters to be able to pronounce an Arabic name correctly. Knowledge of the Arabic language is necessary. A person intending to read the Arabic name "Obayd" for example must know Arabic, and if not, his pronunciation will not be proper as this name can be read as Obayd, Obayyid or Abeed. Without a linguistic background on the grammar of the Arabic language, pronunciation of a word or name will be wrong. The same is true in English and French, wherein a number of words include "silent" or unpronounced letters. So, in many cases, the usual writing systems do not accurately represent the pronunciation of the word or name in the language of origin. Rather, the written form of the word or name is typically only a symbolic representation made with the least possible symbols that enables the speaker of that language itself to retransfer it to the speech of the language of origin. Consequently, in many cases, a literal, symbol-for-symbol transliteration between alphabets of source and target languages will not and cannot result in an exactly sounding name.

Still another problem in the transliteration of words of different languages is the fact that not all of the sounds used in the speech of one language are necessarily present in another language. For example, Arabic uses certain guttural sounds that are absent in English. Hence there are simply no English letters that can accurately reproduce the sounds represented by certain Arabic letters. Accordingly, in some cases, it is literally impossible to transliterate a same sounding name from a source to a target language.

In recognition of the aforementioned relationships between languages and writing systems, and the inherent limitations in transliterating a name or word into a same or similar sounding name or word into a different language, the method of the invention (illustrated in the flow chart of FIG. 1) provides a technique of transliteration that either results in (1) a name that looks the same or very nearly the same between the source and the target languages, or (2) a name in the target language that sounds the same or at least similar to the name in the source language. To these ends, the first step 1 of the method inquires whether or not the letters of the source and target alphabets are the same or substantially the same.

Figure 1:
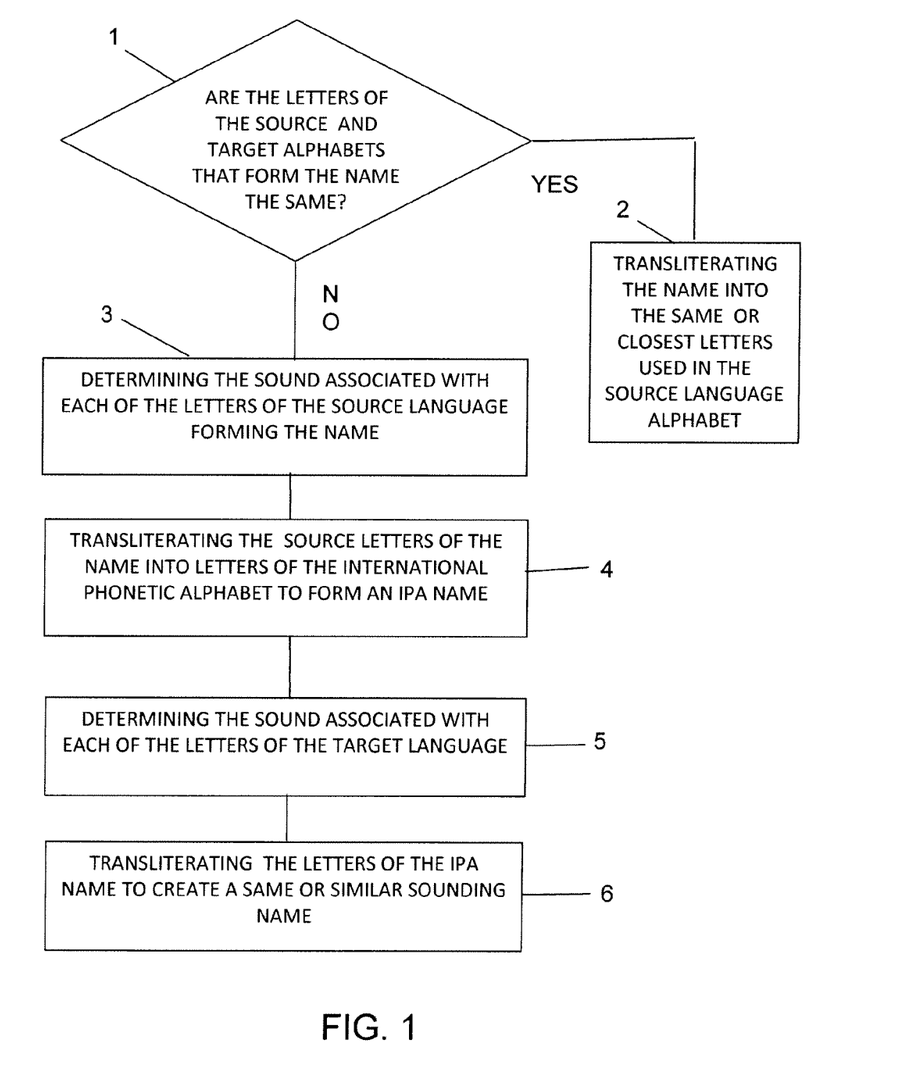
FIG. 1 is a flow chart of the method of the invention.

If the answer to this inquiry is "yes", then the name is transliterated into the same letters in the target alphabet, as indicated in step 2. Even though the pronunciation of the name in the target alphabet is likely to be different from the pronunciation of the name in the source alphabet, this deficiency is more than compensated for by the fact that the resulting name in the target language is visually identical to the name in the source language. In a case where the alphabets between the source and target languages are substantially but not completely the same, then the name is translated into the letters of the target alphabet closest in either (a) appearance to the letter of the source alphabet if there is a letter that looks substantially the same, or (b) sound to the letter of the source alphabet if there is no letter with substantially the same appearance to the corresponding letter in the source alphabet. An example of the application of this step is given hereinafter for a name transliterated between the Arabic and Urdu alphabets.

If the answer to this inquiry is "yes", then the name is transliterated into the International Phonetic Alphabet for two reasons. First, while other phonetic alphabets are known, this alphabet is commonly used throughout the world (it is taught at the Linguistic studies departments all over the world) and hence is already internationally recognized as a "standard" phonetic alphabet. Second, this alphabet contains enough phoneme-representing symbols to accurately produce a same-sounding written representation of almost any word in any source language. The general principle of the IPA is to provide one symbol for each distinctive sound or speech segment. This means that it does not use letter combinations to represent single sounds, or single letters to represent multiple sounds (in the way "x" represents [ks] or [gz] in English). There are no letters that have context-dependent sound values (as "c" does in English and other European languages). Finally, the IPA does not usually have separate letters for two sounds if no known language makes a distinction between them (a property known as "selectiveness"). Among the symbols of the IPA, 107 represent consonants and vowels, 31 are diacritics that are used to further specify these sounds, and 19 are used to indicate such qualities as length, tone, stress, and intonation.

The transliteration of the name from the source language to the IPA is a two-step process, as indicated by step 3, wherein the sound associated with each of the letters of the source language forming the name is first determined, followed by step 4, wherein the sounds represented by the letters of the name in the source language are transliterated into equivalent sounds in the IPA. It should be noted that steps 3 and 4 compensate for the aforementioned deficiencies in the writing systems of many source languages of not providing a written representation of the name or word that accurately represents the pronunciation of the word or name in the language of origin.

In the final steps of the method, the name or word is transliterated from the IPA form of the name or word into the target language. This again is a two-step process, as indicated by step 5 wherein the sound associated with each of the letters of the target language is determined, and step 6 wherein the letters of the IPA form of the name or word is transliterated into the target language to form a same or similar sounding name or word. Because there may not be a single symbol in the target alphabet that accurately reproduces one or more of the corresponding symbols constituting the IPA form of the name or word, several sub-steps are associated with step 6. The sub-steps include either (a) transliterating said non-corresponding letter of the IPA form of the name into a letter of the target alphabet that most closely resembles the sound represented by said one IPA letter to create a similar sounding name in the letters of the target language, or (b) transliterating said one non-corresponding letter of the IPA form of the name into a pair of letters of the target language to create a same or similar sounding name in the letters of the target language, or (c) transliterating said non-corresponding IPA letter into a plurality of letters of the target language to create a same or similar sounding name in the letters of the target language, or (d) transliterating no letter or letters for said non-corresponding IPA letter in the IPA form of the name, or (e) transliterating the non-corresponding IPA letter into a symbol of the target language assigned to sounds that are not present in the target language to create a same or similar sounding name in the letters of the target language.

Figure 2:
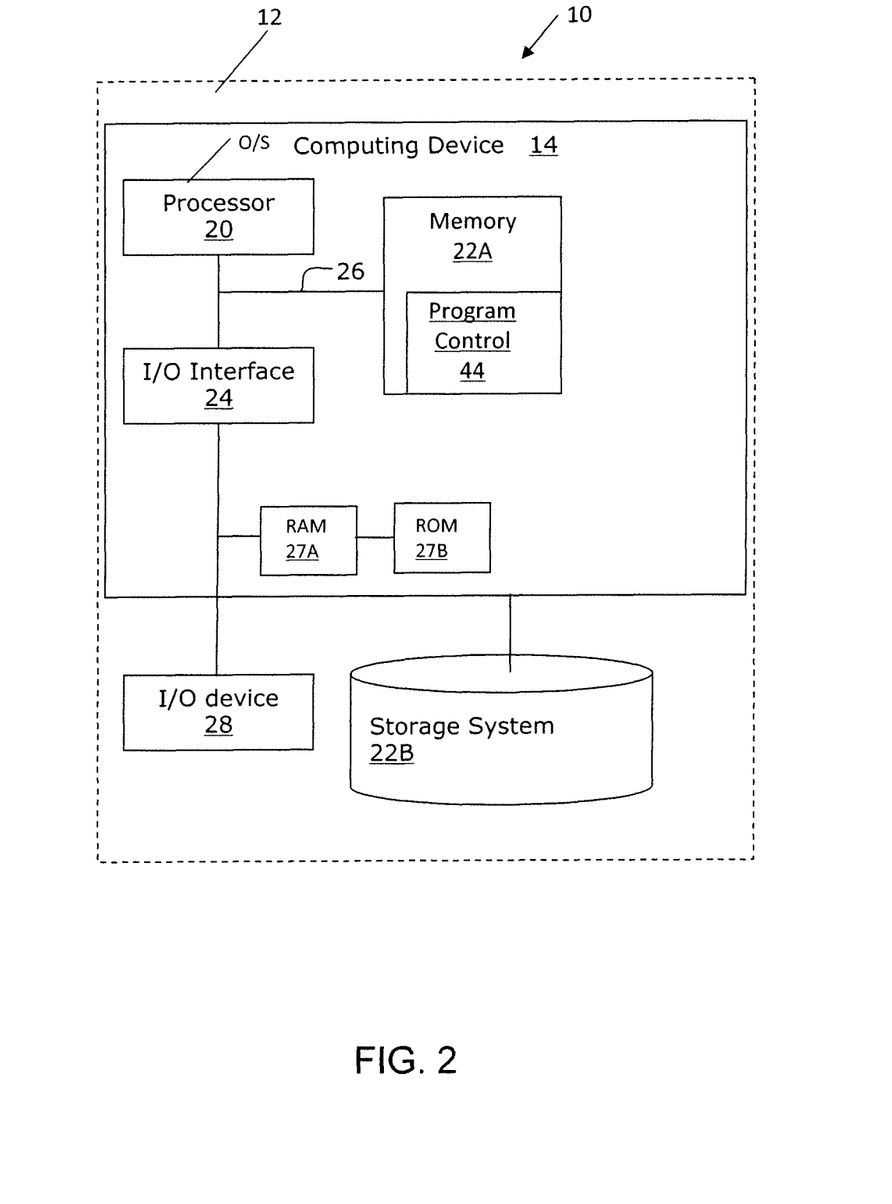
FIG. 2 is a schematic diagram of the system of the invention.

FIG. 2 illustrates the system 10 of the invention, wherein the aforementioned method is implemented. The system 10 includes a server or other computing system 12 that can perform the processes described herein and which includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A includes software for executing the method illustrated in FIG. 1. In addition, the computing device 14 includes random access memory (RAM) 27A, a read-only memory (ROM) 27B, and an operating system (O/S) as shown.

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. The computer program code executed by the processor 20 includes first, second and third program instructions. The first program instructions determine whether the letters of the alphabets of the source and target languages are the same or substantially the same. If so, the second program instructions transliterate the name into the same letters used in the source language alphabet. If not, the third program instructions (1) determine the sound associated with each of the letters of the source language that form the name; (2) transliterate the letters of the name in the source language into letters of the International Phonetic Alphabet (IPA) to create a same or similar sounding name in the letters of the IPA; (3) determine the sound associated with each of the letters of the target language, and (4) transliterate the letters of the IPA form of the name into letters of the target language to create a same or similar sounding name in the letters of the target language.

In a case where not all letters of the name are available in the target alphabet, the second program instructions may further include choosing the letter in the target alphabet closest in appearance to the corresponding letter in the source alphabet is transliterated In a case where no single letter in the target alphabet accurately corresponds to the sound of a letter of the IPA name, the third program instructions may further include transliterating said non-corresponding letter of the IPA form of the name into a letter of the target alphabet that most closely resembles the sound represented by said one IPA letter to create a similar sounding name in the letters of the target language. Alternately in such a case, the third program instructions may include transliterating said one non-corresponding letter of the IPA form of the name into a pair of letters or a plurality of letters or no letters of the target language to create a same or similar sounding name in the letters of the target language.

Finally, in a case where no single letter in the target alphabet accurately corresponds to the sound of a letter of the IPA name, the third program instructions may further include transliterating the non-corresponding IPA letter into a symbol of the target language assigned to sounds that are not present in the target language to create a same or similar sounding name in the letters of the target language.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the method described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

EXAMPLES

The following are examples of how the method and system of the invention may be applied to specific transliterations between different languages.

Passports and Documents of Travel:

1. Name must be written on passports and documents of travel among countries according to the International Phonetic Alphabet (in addition to the system applicable now, which is the writing in Roman letter). This can be easily added within the hidden/invisible information of the passport such as the 2-dimensional-barcode.
2. Transliteration of names among different languages must be based on the following inputs:
    (a) When the letters are substantially the same in the two languages (source and target, with the possibility of having some differences in subscribing some letters) such as the case of Arabic letter between the Arabic and Persian language, the following steps are applied:
        (i) If all letters of the name are available in the target language, it will remain as it is without any change, even if it is pronounced differently. Take for example the Persian name "ضرغام" which is phonetically written as zarqa:m. If it were written in Arabic letters as it is pronounced, it would be "زرغام" but instead it remains in the same way as it is written in the Persian language and it is written in Arabic as "ضرغام". As another example, transliterate the name "Elisabetta" from the Italian language to English. In Italian, this name is pronounced as /i:lisabaito/, while it is written in English language as "Elizabeth". However, applying the method of the invention, it remains as it is in the Italian language (i.e. "Elisabetta") when it is written in the English language because all letters in this name are available in the two languages.
        (ii) If some letters are not available in the letters of the target language they will be transferred to the closest letter in appearance Consider the transliteration of the name "پرویز" "ب" in Urdu (which is often written in English as Pervez) to Arabic. When written in Arabic it is spelled the same with the exception that the letter "پ" which is not available in Arabic, is replaced with the letter "ب" which is the closest letter in appearance in the Arabic alphabet. The letter "و" is also kept as it is, despite the fact that it is pronounced as /v/ in the Urdu language, so that the Urdu name "پرویز" is written in the Arabic language as "برویز". As another example, consider the transliteration of the German name "Jürgen" into English which becomes "Jurgen" as the letter "ü" is not available in English. This principle applies also for the Persian name "چمانه" which includes the letter "چ" which is not among the letters of Arabic language, so it is written in Arabic language as "جمانه", wherein the "ha" at the end of the name remains as it is and is not transferred to "ة" the same as the case in Arabic female names which end with the letter to ("ة").

(b) When the letters of the source language are different from letters of the target language, the following steps are applied:
  (i) If every sound in the source language is available in the target language, the name or word is first written in the symbols of the International Phonetic Alphabetic. The distinctive feature of these symbols is that they are capable of writing the phonetic equivalent of the words of virtually all languages including names of the proper nouns. Table 9 demonstrates that every sound in the Arabic language is accurately represented by a corresponding symbol in the IPA. The IPA form of the word or name is then written in the target language in the letters of the target language which most accurately represent the letters of the IPA form of the name or word. Conversely, when Arabic is the target language, Table 9 can be used to convert the IPA form of the word or name into Arabic. For example, to write the Arabic name "شمس" in the letters of Amharic language, it is first written in the IPA as /§ams/ using the table below, and then is transferred into the letters used in Amharic. If we take the Russian name Annha, it will be phonetically written in this way "/ahli:nah/ and then it will be transferred to the Arabic letters "اهلينه" using the table below. A Japanese name written phonetically as /saki/ in the IPA can be transliterated in Arabic as "ساكي".

3. Writing the name in the source language in the International Phonetic Alphabetic.
4. Taking the symbols which have equivalents in the target language.
5. Handling the symbols which have no equivalents in the target language.
6. Transferring the phonetic symbols of the name into a writing
7. Applying the phono-tactical rules.

The fifth step will be explained in more detail, since the other steps are clear and direct.

There are five options in applying the fifth step, as follows:

First Option: Using letters in the target language which has no separate phonetic rule in their language because some letters in some languages have no independent phonetic function, and they may have different reasons that led them to be there. For instance they might represent sounds which have been abandoned and no existence in the present form of the language, while the letter in the written form remained. An example of this is the Roman letter "q" which has no independent pronunciation in the English language, and it symbolizes the sound /k/ which also has representation in the letters used in writing words of the English language "ch", k, c, and this letter has been used in writing the Arabic names containing the letter "ق" because the letter "q" is the phonetic symbol corresponding with the sound of the Arabic letter in the IPA. So, the Arabic name "قاسم" for instance is written as "Qasim' in letters of English language, and the letter "k" continues to represent the Arabic letter "ك" as in the Arabic name "كمال" which is written as "kamal".

Second Option: Using a combination of letters which when pronounced become closer to the desired sound. For example the two letters "gh" have been used to symbolize a sound close to sound "غ", while the two letters "kh" are used to symbolize the sound /خ/. So, the Arabic name "غازي" is written as "Ghazi" in letters of the English language, and the Russian name "خرشوف" is written as "Khrushev". Applying this rule, the Irish name "Padraig" which is pronounced as /pawdrig/, will be written as "بأودريق". when written in Arabic letters.

Third Option: Using symbols assigned specially to the new sounds, and this may not be followed unless it becomes not possible to use the writing system in the target language as in the Japanese language for instance which uses the writing system "Kanji" which is borrowed from writing system of the

TABLE 9

Corresponding Sounds of the IPA and Arabic Language Alphabet

| Letter | symbol | Letter | symbol | Letter | symbol | Letter | symbol | Letter | symbol |
|---|---|---|---|---|---|---|---|---|---|
| ء | - | د | d | ض | D ■ | ك | k | ́ | a |
| ب | b | ذ | ð | ط | T ■ | ل | l | ́ | u |
| ت | t | ر | r | ظ | | م | m | ́ | i |
| ث | θ | ز | z | ع | ʕ | ن | n | ́ | a: |
| ج | ʤ | س | s | غ | ʁ | ه | h | ́ | u: |
| ح | | ش | ʃ | ف | f | و | w | ́ | i: |
| خ | x | ص | S ■ | ق | q | ي | j | | |

(ii) If every sound in the source language is not available in the target language, then different steps must be followed to arrive at a best approximation of a same or similar sounding word or name in transliteration. For example, the first sound in the Irish name "Padraig" (which is pronounced as /pawdrig/), does not exist in Arabic, so it is necessary to look for an alternative. In such a case, the following steps are followed:
  1. Determining the phonetic system in the source language;
  2. Determining the phonetic system in the target language;

Chinese language. This writing system is not helpful in writing foreign names as it represents the symbolic writing as mentioned above and not the alphabetic writing. Therefore the Japanese have designed a new writing system closer to the alphabetic system to meet this purpose. By following the new writing system ("katakana"), Japanese are able to write foreign names, noticing that this was not at the expense of the Japanese phonetic system, which is why the sound /ɔ/ which represents the two letters "th" in the previous name is not within the Japanese phonetic system and it is replaced by a symbol representing the sound /s/ which is one of the components of the Japanese phonetic system.

The Approach of Choosing the Closest Sound

Other examples include the transference of the sound /N/ as at end of the name Flemming from English to Arabic, the transference of the sound "ط" as at the beginning of the name "طه" from Arabic to English. The "exit" here refers to the place of articulation in the phonetic system such as the lips, the alveolar, the glottal and others. The main features refer to manner of articulation such as oral or nasal, while the secondary features refer to stress and non stress.

Fourth Option: Replacing them by letters representing the sounds closest to them in the target language. In this case we take the letter or letters which represents the closest sound in the target language to the sound in the source language in terms of pronunciation and form. The above diagram represents this process.

Fifth Option: To exclude them completely from the name. This option is only when all former options are not possible. An example of this is writing the two sounds /ع/, /ء/ in the Arabic names in Roman letters. These two sounds have no representation in the Roman letters, and none of the previous options is applicable to them including the fourth one for two reasons. The first reason is that the closest sound to them in English language is /h/ and this sound represents two sounds in the Arabic language which are /هـ/, /ح/ as in the two names "هاني" "Hani" and حازم "Hazim" consecutively, so it is difficult to make the letter "h" hold other additional letters. The second reason is that although /h/ is relatively close in terms of place of articulation to the letter /ع/, it is not close to it in terms of feature as "ع" is voiced while /h/ is voiceless.

As follows we find examples of the transliteration for some names from foreign languages to Arabic according to the system proposed in this paper:

From Russian to Arabic

TABLE 10

From Russian to Arabic

| Name in Russian (Slavic) Phonetic writing | v | l | a | d | i | m | i | r |
|---|---|---|---|---|---|---|---|---|
| Corresponding Arabic Sounds | و/ف | ل | ´ | د | ؟ | م | ؟ | ر |
| Closer Arabic Sounds | و/ف | | | | | | | |
| Full name | ف | ل | ´ | د | ؟ | م | ؟ | ر |
| Name from right side | | | | | قديمر | | | |
| Arabic Phonotactic Rules | | | | | فلاديمير | | | |

According to Table 11, this name can also be written in Arabic as "ولاديمير" and the reason is that the relation between /v/, ف on one side (1) and /v/, /و/ on the other side (2) is almost the same because their place of articulation is almost the same but in (1) the two sounds are fricative but the second one is voiceless while the first is voiced, and in (2) both are voiced but the second one is glide and the first is a consonant, so both options "ولاديمير" and "فلاديمير" are acceptable.

TABLE 11

From English to Arabic

| Name in English (Roman) | | | Clinton | | | |
|---|---|---|---|---|---|---|
| Phonetic writing | k | l | i | n | t | n |
| Corresponding Arabic Sounds | ك | ل | - | ن | ت | ن |
| Closer Arabic Sounds | | | | | | |
| Full name | ك | ل | -ِ | ن | ت | ن |
| Name from right side | | | | كلتن | | |
| Arabic Phonotactic Rules | | | | كليثون | | |

An example of the writing of a Chinese name in Arabic letters is as follows:

An example of the 麦 of a Hebrew name in Arabic letters is as follows:

ديفيد ←daiv§d← דוד

Although this name is available in Arabic and known as "داوود", we have conserved its pronunciation as it is as same as in the language of its holder.

Another example: the writing of the Indonesian name Asim in the Arabic language as "سيم" despite the fact that its origin in Arabic is "عاصم"

The following Persian names are written as follows:

امنة ← "آمنة"
ن گ ا ر ← "نگار"
س پ هرم ← سپهرم

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A system for transliterating a name written in the letters of an alphabet of a source language to a name in the letters of an alphabet of a target language that is different from the source language comprising:
   a CPU, a computer readable memory and a computer readable storage media;
   first program instructions to determine whether the letters of the alphabets of the source and target languages are the same or substantially the same;
   second program instructions implemented when the first program instructions determines that the letters of the alphabets of the source and target languages are the same or substantially the same including transliterating the name into the same letters used in the source language alphabet; and
   third program instructions implemented when the first program instructions determines that the letters of the alphabets of the source and target languages are not the same or substantially the same, including determining the sound associated with each of the letters of the source language that form the name; transliterating the letters of the name in the source language into letters of the International Phonetic Alphabet (IPA) to create a same or similar sounding name in the letters of the IPA; determining the sound associated with each of the letters of the target language, and transliterating the letters of the IPA form of the name into letters of the target language to create a same or similar sounding name in the letters of the target language,
   wherein the second program instructions further include choosing the letter in the target alphabet closest in appearance to the corresponding letter in the source alphabet is transliterated in the case where not all letters of the name are available in the target alphabet, and
   the first, second, and third program instruction are stored on the computer readable storage media.

2. A system for transliterating a name written in the letters of an alphabet of a source language to a name in the letters of an alphabet of a target language that is different from the source language comprising:
   a CPU, a computer readable memory and a computer readable storage media;
   first program instructions to determine whether the letters of the alphabets of the source and target languages are the same or substantially the same;
   second program instructions implemented when the first program, instructions determines that the letters of the alphabets of the source and target languages are the same or substantially the same including transliterating the name into the same letters used in the source language alphabet; and
   third program instructions implemented when the first program instructions determines that the letters of the alphabets of the source and target languages are not the same or substantially the same, including determining the sound associated with each of the letters of the source language that form the name; transliterating the letters of the name in the source language into letters of the International Phonetic Alphabet (IPA) to create a same or similar sounding name in the letters of the IPA; determining the sound associated with each of the letters of the target language, and transliterating the letters of the IPA form of the name into letters of the target language to create a same or similar sounding name in the letters of the target language,
   wherein the third program instructions further include, in a case where no single letter in the target alphabet accurately corresponds to the sound of a letter of the IPA name, transliterating said non-corresponding letter of the IPA form of the name into a letter of the target alphabet that most closely resembles the sound represented by said one IPA letter to create a similar sounding name in the letters of the target language, and
   the first, second, and third program instruction are stored on the computer readable storage media.

3. A system for transliterating a name written in the letters of an alphabet of a source language to a name in the letters of an alphabet of a target language that is different from the source language comprising:
   a CPU, a computer readable memory and a computer readable storage media;
   first program instructions to determine whether the letters of the alphabets of the source and target languages are the same or substantially the same;
   second program instructions implemented when the first program instructions determines that the letters of the alphabets of the source and target languages are the same or substantially the same including transliterating the name into the same letters used in the source language alphabet; and
   third program instructions implemented when the first program instructions determines that the letters of the alphabets of the source and target languages are not the same or substantially the same, including determining the sound associated with each of the letters of the source language that form the name; transliterating the letters of the name in the source language into letters of the International Phonetic Alphabet (IPA) to create a same or similar sounding name in the letters of the IPA; determining the sound associated with each of the letters of the target language, and transliterating the letters of the IPA form of the name into letters of the target language to create a same or similar sounding name in the letters of the target language,
   wherein the third program instructions further include, in a case where no single letter in the target alphabet accurately corresponds to the sound of a letter of the IPA name, transliterating said one non-corresponding letter of the IPA form of the name into a pair of letters of the target language to create a same or similar sounding name in the letters of the target language, and
   the first, second, and third program instruction are stored on the computer readable storage media.

4. A system for transliterating a name written in the letters of an alphabet of a source language to a name in the letters of an alphabet of a target language that is different from the source language comprising:
   a CPU, a computer readable memory and a computer readable storage media;

first program instructions to determine whether the letters of the alphabets of the source and target languages are the same or substantially the same;
second program instructions implemented when the first program instructions determines that the letters of the alphabets of the source and target languages are the same or substantially the same including transliterating the name into the same letters used in the source language alphabet; and
third program instructions implemented when the first program instructions determines that the letters of the alphabets of the source and target languages are not the same or substantially the same, including determining the sound associated with each of the letters of the source language that form the name; transliterating the letters of the name in the source language into letters of the International Phonetic Alphabet (IPA) to create a same or similar sounding name in the letters of the IPA; determining the sound associated with each of the letters of the target language, and transliterating the letters of the IPA form of the name into letters of the target language to create a same or similar sounding name in the letters of the target language,
wherein the third program instructions further include, in a case where no single letter in the target alphabet accurately reproduces the sound of a letter of the IPA name, transliterating said non-corresponding IPA letter into a plurality of letters of the target language to create a same or similar sounding name in the letters of the target language, and
the first, second, and third program instruction are stored on the computer readable storage media.

5. A system for transliterating a name written in the letters of an alphabet of a source language to a name in the letters of an alphabet of a target language that is different from the source language comprising:
a CPU, a computer readable memory and a computer readable storage media;
first program instructions to determine whether the letters of the alphabets of the source and target languages are the same or substantially the same;
second program instructions implemented when the first program instructions determines that the letters of the alphabets of the source and target languages are the same or substantially the same including transliterating the name into the same letters used in the source language alphabet; and
third program instructions implemented when the first program instructions determines that the letters of the alphabets of the source and target languages are not the same or substantially the same, including determining the sound associated with each of the letters of the source language that form the name; transliterating the letters of the name in the source language into letters of the International Phonetic Alphabet (IPA) to create a same or similar sounding name in the letters of the IPA; determining the sound associated with each of the letters of the target language, and transliterating the letters of the IPA form of the name into letters of the target language to create a same or similar sounding name in the letters of the target language,
wherein the third program instructions further include, in a case where no single letter in the target alphabet accurately corresponds to the sound of a letter of the IPA name, transliterating no letter or letters for said non-corresponding IPA letter in the IPA form of the name, and
the first, second, and third program instruction are stored on the computer readable storage media.

6. A system for transliterating a name written in the letters of an alphabet of a source language to a name in the letters of an alphabet of a target language that is different from the source language comprising:
a CPU, a computer readable memory and a computer readable storage media;
first program instructions to determine whether the letters of the alphabets of the source and target languages are the same or substantially the same;
second program instructions implemented when the first program instructions determines that the letters of the alphabets of the source and target languages are the same or substantially the same including transliterating the name into the same letters used in the source language alphabet; and
third program instructions implemented when the first program instructions determines that the letters of the alphabets of the source and target languages are not the same or substantially the same, including determining the sound associated with each of the letters of the source language that form the name; transliterating the letters of the name in the source language into letters of the International Phonetic Alphabet (IPA) to create a same or similar sounding name in the letters of the IPA; determining the sound associated with each of the letters of the target language, and transliterating the letters of the IPA form of the name into letters of the target language to create a same or similar sounding name in the letters of the target language,
wherein the third program instructions further include, in a case where no single letter in the target alphabet accurately corresponds to the sound of a letter of the IPA name, transliterating the non-corresponding IPA letter into a symbol of the target language assigned to sounds that are not present in the target language to create a same or similar sounding name in the letters of the target language, and
the first, second, and third program instruction are stored on the computer readable storage media.

7. A system for transliterating a name written in the letters of an alphabet of a source language to a name in the letters of an alphabet of a target language that is different from the source language comprising:
a CPU, a computer readable memory and a computer readable storage media;
first program instructions to determine whether the letters of the alphabets of the source and target languages are the same or substantially the same;
second program instructions implemented when the first program instructions determines that the letters of the alphabets of the source and target languages are the same or substantially the same including transliterating the name into the same letters used in the source language alphabet; and
third program instructions implemented when the first program instructions determines that the letters of the alphabets of the source and target languages are not the same or substantially the same, including determining the sound associated with each of the letters of the source language that form the name; transliterating the letters of the name in the source language into letters of the International Phonetic Alphabet (IPA) to create a same or similar sounding name in the letters of the IPA; determining the sound associated with each of the letters of the target language, and transliterating the letters of the IPA form of the name into letters of the target language to create a same or similar sounding name in the letters of the target language,
wherein the name in the source language is represented by a single letter or character in the source language, and wherein the IPA form of the name includes a plurality of letters of the International Phonetic Alphabet, and
the first, second, and third program instruction are stored on the computer readable storage media.

* * * * *